United States Patent [19]
Zumbach et al.

[11] 3,948,082
[45] Apr. 6, 1976

[54] METHOD AND DEVICE FOR CONTACTLESS MEASURING OF THE THICKNESS OF LAYERS, PARTICULARLY OF INSULATING LAYERS ON METALLIC PARTS

[75] Inventors: Bruno Zumbach, Orpund; Peter Nopper, Lyss; Mathias Brunner, Magglingen, all of Switzerland

[73] Assignee: Zumbach Electronic-Automatic, Orpund, Switzerland

[22] Filed: Dec. 23, 1974

[21] Appl. No.: 535,964

Related U.S. Application Data
[63] Continuation of Ser. No. 316,402, Dec. 18, 1972, abandoned, which is a continuation-in-part of Ser. No. 122,059, March 8, 1971, abandoned.

[30] Foreign Application Priority Data
Mar. 11, 1970 Switzerland.......................... 3588/70

[52] U.S. Cl............................. 73/37.5; 324/34 TK
[51] Int. Cl.²................... G01B 13/12; G01R 33/12

[58] Field of Search ......... 73/37.5, 37.6, 37.7, 37.8; 33/DIG. 2; 324/34 TK

[56] References Cited
UNITED STATES PATENTS

| | | | |
|---|---|---|---|
| 2,927,455 | 3/1960 | Outterson | 73/37.7 |
| 3,321,838 | 5/1967 | Albertson, Jr. | 73/37.5 X |
| 3,513,555 | 5/1970 | Vachon | 324/34 TK X |
| 3,610,024 | 10/1971 | Honjo et al. | 73/37.5 |
| 3,617,872 | 11/1971 | Horn et al. | 324/34 TK |

*Primary Examiner*—Richard C. Queisser
*Assistant Examiner*—Joseph W. Roskos

[57] ABSTRACT

A method and device for contactless measuring of the thickness of layers, particularly of insulating layers on metallic parts whereby a contactless pneumatic servo-mechanism approaches to and maintains a measuring head at a predetermined distance from the layer and whereby the thickness of the layer is ascertained by a measuring pick-up located in the measuring head.

24 Claims, 8 Drawing Figures

METHOD AND DEVICE FOR CONTACTLESS MEASURING OF THE THICKNESS OF LAYERS, PARTICULARLY OF INSULATING LAYERS ON METALLIC PARTS

CROSS-REFERENCE TO RELATED APPLICATION

This application is a continuation of application Ser. No. 316,402 filed Dec. 18, 1972, which was a continuation-in-part of application Ser. No. 122,059, filed Mar. 8, 1971 both now abandoned. Priority is claimed from Swiss patent application No. 3588/70 filed Mar. 11, 1970.

This invention relates to a method and device for contactless measuring the thickness of a layer on an object to be measured, whereby a measuring head is approached to a predetermined distance from the layer by means of a contactless pneumatic servo-control mechanism and the thickness of the layer is ascertained by a measuring pick-up located in the measuring head.

Such a known method uses an optical servo-control. However, optical scanning devices are complicated and sensitive to foreign influences, such as vapours occuring e.g., during the production of cables. Each condensation on parts of optical devices risks the control. It is difficult to locate optical scanning devices in the immediate vicinity of the real measuring pick-up, e.g. coils, for ascertaining the thickness of the layer.

Pneumatic servo-control has also been proposed for approaching a measuring head towards a layer of which the thickness is to be measured. In these prior systems a cushion of compressed air is formed between the object to be measured and a plate, and therefore, this prior system is practically only applicable with objects having flat and smooth surfaces and being at rest. The prior system would not be suitable for measuring the thickness of the insulating coating of cables leaving the extruding nozzle of an extruder. Further, the prior system is unsuitable for measurement alternatively in different directions, for instance in vertical direction from above and from below and in horizontal direction because the own weight of the measuring system which has directly to be compensated by the air pressure existing between the measuring object and said plate is different according to whether the own weight of the measuring system is added to a force applying the system against the object when measuring from above, or the own weight is substracted when measuring from below.

It is an object of this invention to avoid the drawbacks of the prior system by providing a novel pneumatic servo-control of the position of the measuring head, this servo-control system including a sensing nozzle of small cross section and a servo-motor displacing said nozzle by means of a spindle. With this type of servo-control it is possible to accurately position the nozzle and measuring head respectively relatively to small and curved surface areas, this allowing to accurately measure the thickness of the insulation of a cable leaving an extruder. Due to the mechanical servo-control by means of a spindle, the measurement is not falsified by the position of the nozzle.

The known methods neglect the problem that even in the case of a contactless measuring particular attention must be given to the reciprocal position of the object to be measured and the measuring head. Such, e.g. the measuring correctly the insulating thickness of a cable it is not sufficient by means of a servo-control to attend to the distance of a measuring pickup from the cable surface being kept constant but — at least in the case of an inductive measuring pick-up — a further requirement consists in the fact that its axis should coincide with a radius of the cable. Each lateral divergence would lead to an adulteration of the measuring not only because the servo-control would work inaccurately but also because the measuring pick-up would be influenced in another way. But since even the most interesting objects to be measured, such as cables and the like, may include saging and other bent portions the last named condition is difficult to be met with, especially if — as usually — the thickness of the layer must be measured at different places of the circumference, i.e. if the same measuring head must be approached in horizontal and vertical direction to the object to be measured. Now, the novel pneumatical servo-control according to this invention permits a measuring of the thickness of the layer by means of the measuring pick-up in the sphere of influence of the measuring jet of the pneumatical servo-control. Thereby, as well a measuring jet of the pneumatic servo-control as a measuring pick-up for measuring the thickness of the layer may be approached to the layer perpendicularly to the layer and the tangent respectively, whereby measuring errors resulting from the above mentioned circumstances may be avoided. In a preferred manner the measurement may be carried out in the immediate vicinity of a point of support of the object to be measured. It seems paradoxal and therefore not obvious to measure without contacting on the one hand and to support the object to be measured preferably in the immediate vicinity of the measuring head on the other hand since in any case a supporting cannot be effected without contacting. In very many cases, however, this variance is only seeming, e.g. in the production of cables where measurement is possible immediately in front of the jet, in which the cable conductor is sprayed over and consequently supported. With other objects, e.g. bands running from a manufacturing device or the like it may be admissible, it is true, the one side of such objects to let run over supporting surfaces whilst on the other side not an idea of a contact is allowed. When sheet irons are coated, e.g. it is well possible to let run the sheet iron over a support whilst the thickness of the coating must be measured without any contacting.

According to a special embodiment of the invention its problem may also be solved by providing an inductive pick-up having a coiled annular core, whereby in the annular core an elongated preferably straight air gap is formed. In this case it makes no longer a difference on which spot the object to be measured is located before the air gap, i.e. it is no longer a requirement that the measuring head is kept most precisely above a destined spot, e.g. the generating line of the object to be measured. Herein for further simplification the measuring jet too may be formed as a longitudinal slotted jet.

The use of a pneumatical servo-control leads to a considerable simplification and simultaneously improvement because due to the permanent supply of fresh air into the measuring space there are accomplished circumstances substantially independent of variable foreign influences. In the case of the measurement of cables just extruded, an advantageous cooling of the measuring device takes place. The pneumatical measuring also permits an especially advantageous and simple concentric arrangement of a measuring jet and a measuring coil for inductive measurement of the thickness of a layer, whereby it is guaranteed that the measuring for the servo-control and the measurement of the thickness of the layer really take place on the very same spot of the object to be measured.

Preferably in combination with the aforesaid conditions it may be made provision for periodically lifting off the measuring head from the object to be measured by means of an automatically operating device and thereby conveying in case to another measuring spot, e.g. to another generating line of a cable, whereby a post-gauging of the measuring device may take place likewise automatically. Therewith simultaneously the influence of the object to be measured, e.g. of a hot cable, over the measuring device is reduced and deviations of the measuring reference point are consecutively compensated.

It is possible to provide additionally a periodical gauging, whereby a further operating device approaches the measuring head periodically to an object to be gauged and causes an automatical gauging. Thereby the object to be gauged and the measuring head may be arranged on a common movable support.

The drawings show as well as embodiment of the measuring device according to the invention for testing the insulating thickness of cables as a variant of the embodiment.

Figures 1, 3:
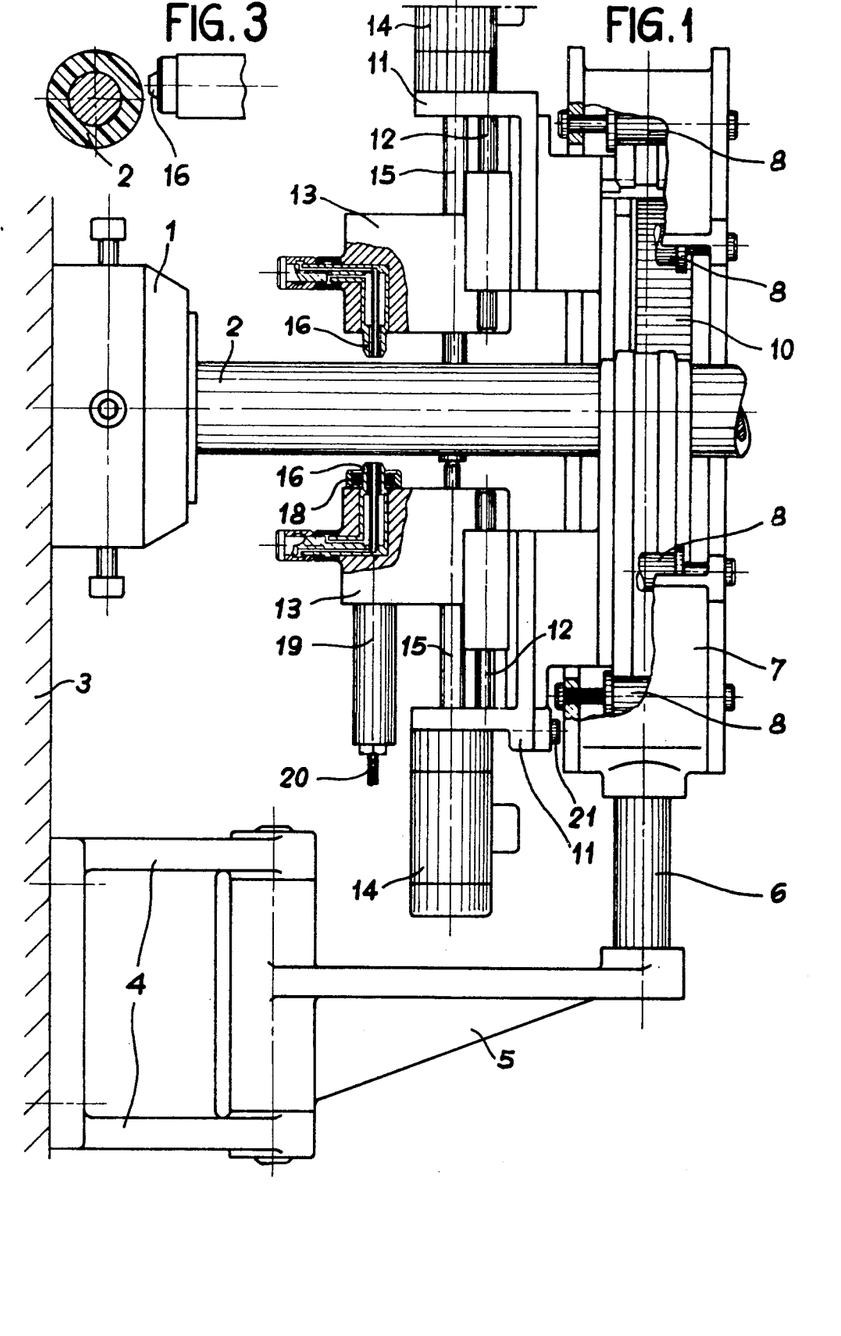
FIG. 1 shows a partly sectional side elevation of the embodiment.
FIG. 3 serves for illustration of the influence of asymmetrical position between measuring head and object to be measured.

In FIG. 1 there is indicated the extruding head 1 of a device for extruding plastics over cables, from which the cable 2 is ejected with the still hot and plastic coating. On the frame 3 of the device there is fixed a support 4 having a swinging arm 5, to which a one-sided open annular cage 7 is mounted. Within the cage 7 there are supported guide rollers 8, between which a one-sided open annular support 9 is pivoted. The driving pinion of a not shown reduction gear of a motor mounted to the cage 7 meshes with an internal gear 10 of the support 9 and allows to impart a periodical oscillating rotation within a predetermined range of e.g. 90° or 270° to this support.

To the support 9 there are fixed two diametrically arranged fixtures 11 having guide columns 12. Guided by these guide columns 12 there are supports 13, each of which is moveable along the guide column 12 by means of a spindle 15 driven by a servo-motor 14. Each of the supports 13 contains a similar measuring nozzle 16 having two concentrical exhaust openings and supply pipes, both being connected to a pneumatical control device through connecting nipples 17 pivotally mounted to a joining socket and through conduits 18.

The pneumatic control device will be explained in detail below.

The lower measuring nozzle 16, is concentrically surrounded by a measuring coil 18 connected to a measuring oscillator located within a housing 19. This oscillator is connected to a measuring and indicating device through a cable 20. Such measuring devices having an inductive measuring coil and a frequency-modulated measuring oscillator are known per se.

Figure 2:
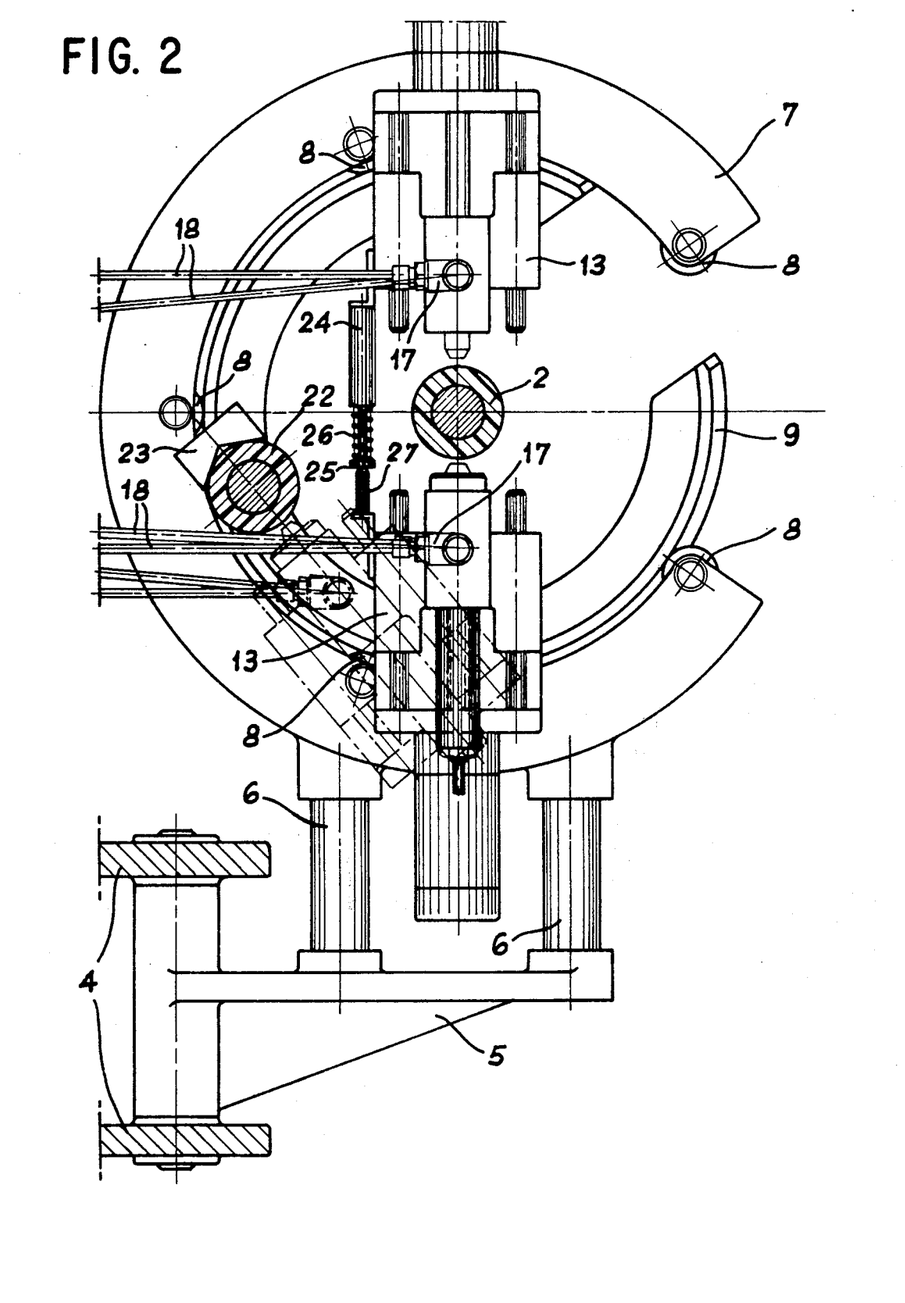
FIG. 2 shows the partly sectional front view of the embodiment.

The lower fixture 11 is swingable around an axis 21 indicated in FIG. 1 and may be swivelled from the usual measuring position indicated by full lines and defined by notch or stop to a gauging position indicated in FIG. 2 by dot-dash lines and also defined by notch or stop. In this gauging position the measuring nozzle 16 and the measuring coil 18 face a calibrating object 22, i.e. a mock-up of the cable 2 to be tested having desired dimensions and characteristics. The calibrating object 22 is fixed to a prism 23, e.g. stretched by means of elastic bands, said prism being connected to the support 9.

A measuring gauge 24 of a known type, e.g. an inductive differential transmitter, is connected to the upper support 13 by means of a mounting angle, the measuring pin 25 of said differential transmitter being urged under the influence of a spring 26 into an end position defined by a stop when no external force is acting. But usually a bolt 27 arranged on the lower support 13 acts on the measuring pin 25 and defines the position of the measuring pin 25. Therefore, usually the gauge 24 delivers a measuring value typical for the reciprocal distance of the supports 13 and the measuring nozzles 16 respectively.

Figure 6:
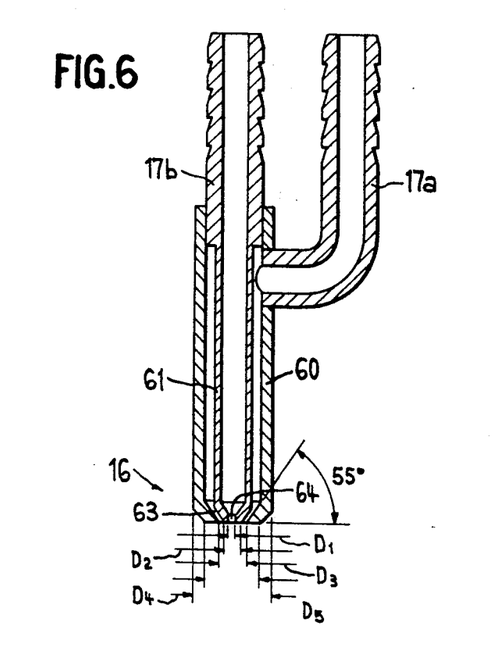
FIG. 6 is a section of the measuring nozzle on an enlarged scale.

FIG. 6 shows in detail the structure of a measuring nozzle 16 and also of an auxiliary sensing nozzle described below with reference to FIG. 8. The nozzle has an outer mantle 60 to which is soldered or welded a connection piece 17a for admitting pressure air into the space formed between mantle 60 and central sensing tube 61 concentrically disposed in mantle 60. Sensing tube 61 is made in one part with a connection piece 17b soldered or welded into and closing the upper end of mantle 60. The conical lower ends of mantle 60 and tube 61 define a conical exit slit 63 for pressure air, the inclination of this slit relatively to the plane of the lower face of the nozzle being of 55°. A sensing aperture 64 formed at the lower end of sensing tube 61 has a diameter $D_1$ of 1mm, diameter $D_2$ is of 2 mm, diameter $D_3$ is of 2,5 mm, diameter $D_4$ is of 4 mm and diameter $D_5$ is of 6 mm, the frusto-conical surface 65 being at an angle of 45°. It is thus seen that pressure air leaving exit slit 63 forms a conical air jet having a diameter of not more than 2.5 mm at the nozzle and even less at a small distance from the nozzle where the jet hits the surface of the object to be measured. A pressure is built up inside the conical jet of pressure air leaving exit slit 63, this pressure depending on the distance of the nozzle from a surface of an object. This pressure is sensed by sensor tube 61 and its sensing opening 64 respectively, and is transmitted to a measuring system.

Figure 7:
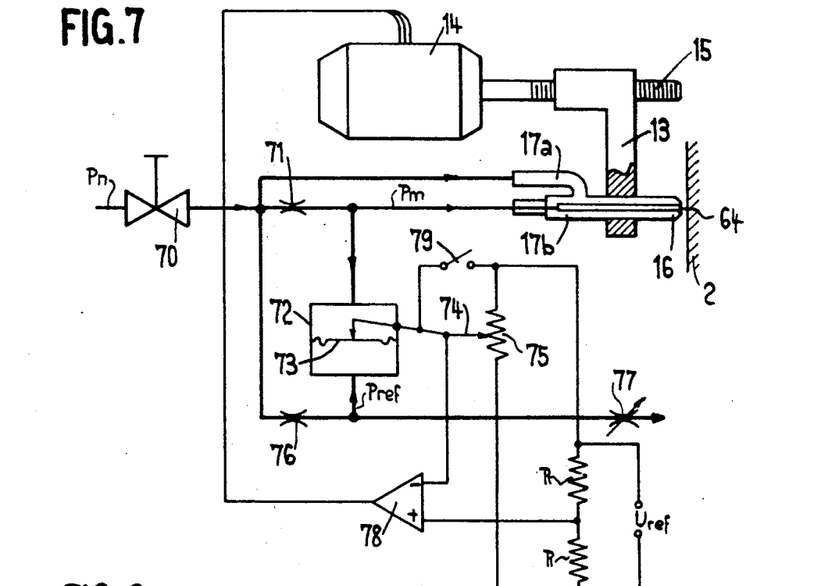
FIG. 7 is a pneumo-electric diagram showing the servo-control system.

This measuring system is shown in FIG. 7 wherein nozzle 16 with its sensing aperture 64 and its connection pieces 17a and 17b is schematically shown. Pressure is applied to the system from a source not shown in the diagram at a pressure $P_N$ of 1 to 8 kp/cm². This pressure is reduced in an adjustable pressure regulator 70 to a stabilized value of 0.2 kg/cm². This pressure is admitted to connection piece 17a and to the exit slit 63 of nozzle 16. A measuring pressure Pm reduced in an adjustable flow resistor 71 is admitted to a line connected on one hand to connection piece 17b and to the sensing tube 61 and sensing aperture 64 respectively, and to the upper side of a differential pressure meter 72 having a diaphragm 73 mechanically connected to the slider 74 of a potentiometer 75. A reference pressure $P_{ref}$ is applied to the lower inlet of the differential pressure meter 72, this reference pressure $P_{ref}$ being determined by a fixed flow resistor 76 and a variable flow resistor 77 to a value of about 0.05 kp/cm². Potentiometer 74 is connected into a measuring bridge having a pair of equal resistor R. A reference voltage $U_{ref}$ is applied to the input terminals of the bridge, and its output terminals are connected to the input of a servo amplifier 78 of which the output is applied to servo-motor 14 of which the spindle 15 controls the support 13 of nozzle 16.

The operation of the device explained so far is as follows:

In the measuring position as shown the cable 2 passes through the measuring device. Independent of each other both measuring nozzles 16 are approached to a defined distance from the surface of the cable. The position of both nozzles 16 is defined by a balanced condition of the system, that is the pressure meter is in a position for which slider 74 is in the middle of potentiometer 75 and the bridge is balanced. No power is applied to servo-motor 14. If for some reason the distance between one of the nozzles and the cable surface decreases, the pressure at sensing opening 64 of that nozzle and consequently at the upper side of diphragm of meter 72 increases, the diaphragm is displaced downwardly and potentiometer slider 74 is displaced upwardly. The measuring bridge becomes unbalanced and a correcting signal is applied through amplifier 78 to motor 14 by which the nozzle 16 is brought to its defined distance from the cable surface. Opposite balancing and correction occurs if one of the nozzles 16 is at a distance exceeding said defined distance. Therewith the outer diameter of the cable is indicated by means of the gauge 24. By approaching the lower measuring nozzle 16 to a defined distance from the surface of the cable also the measuring coil 18 is approached to a defined distance from the surface of the cable. The electromagnetical field of the measuring coil 18 penetrates the cable conductor and is influenced by the same, whereby the influence depends on the distance between the coil and the cable conductor and thus on the thickness of the insulating layer. After performance and evaluation of the measurement for the shown position, what may take place very quickly, the servo-control is made ineffective by closing switch 79 of each circuit associated with one of nozzles 16, bridging the upper portion of potentiometer 75, whereby supports 13 and measuring nozzles 16 are removed from the cable. Then, the support 9 in the cage 7 is turned by 90° so that the measuring heads consisting of the supports 13, the measuring nozzles 16 and the measuring coil 18 reach a horizontal position. Now, they are approached again to the cable by reopening the switches 79 whereby the servo-control is made effective so that a new measurement may take place. After the measurement the measuring heads are removed again, turned by further 90° and approached. In this manner by turns in short periods measurements are carried out on spots spaced by 90° from each other, whereby the measuring members are approached to the hot cable as shortly as possible and therefore are not heated excessively.

Everytime when the measuring heads are transferred from the one measuring position to the other one, zero balancing of the measuring device connected to the measuring coil may be effected in a manner set out in our copending patent application Ser. No. 28,228, filed Apr. 4, 1970, as long as the measuring heads are removed. Thereby the device becomes insensitive to high heating of the measuring device in the immediate vicinity of the extruder 1. On account of completeness it should be noted that for the time being the support 9 together with the measuring heads and the object to be gauged is turned by 270° in one direction and then returns. Consequently, all the connections can be accomplished by flexible conduits and cables and therefore no rotating transformers are needed.

The measurement in immediate vicinity of the extruding head 1 is of importance not only for the immediate determination of errors but also for the sufficiently exact orientation of the measuring device with respect to the cable. Namely, the contactless measuring does not permit a direct mutual orientation of object to be measured and measuring pick-up by contacting. Even thick cables will somewhat sag between the extruding head 1 and the next point of support. Thus, even if it may be supposed that the measuring nozzles 16 being in the vertical position according to FIG. 2 are symmetrical to the middle plane of the cable this assumption must no longer hold true absolutely when the measuring heads are in a horizontal position. In FIG. 3 there is indicated that upon slight sag of the cable the measuring nozzle 16 and consequently the measuring coil 18 may be approached asymmetrically with respect to the cable what may cause measuring errors as well in the pneumatic servo-system as in the electromagnetical thickness measuring system upon considerable asymmetry. By the rigid connection of the measuring device to the frame of the extruder as shown, and by the measurement in the immediate vicinity of the cable support formed by the extruder 1 asymmetries resulting in measuring errors may be avoided. In other cases, however, additional expedients are needed which are disclosed as below.

If the device is used not only for indicating relative differences of the insulating thickness or the cable diameter, but if absolute values are desired a gauging is required from time to time. However, in the illustrated embodiment wherein only one measuring head is swingable against the object 22 to be gauged the diameter indication cannot be re-calibrated during the operation but only the indication of the thickness of the layer. For this purpose it is only necessary to swivel the lower measuring head into the dot-dash position in FIG. 2 and to effect calibration. This calibration may be carried out automatically and since the calibrating object is arranged on the support 9 together with the measuring heads and is turning therewith calibration may take place at any time between subsequent measurements of thickness on the cable itself.

It is also possible to arrange both measuring heads on a common carrier swingable round the axis 21 connected to the support 9 and to swivel them together with the path transmitter 24 into the calibrating position. For this purpose naturally all parts must be formed and arranged in such a manner that this swivelling movement is not restrained. In this case the common swivelling movement of both the measuring heads may serve also for removing the same form the range of influence of the cable between subsequent measurements, what may be accomplished more quickly and more simply than the above supposed control by means of the servo-motors 14. The measuring heads have three positions in this case, namely the illustrated measuring position, the calibrating position indicated in dash-dotted lines in FIG. 2 and an intermediate balancing position, into which they are brought usually between the several measurements.

As already indicated above, it may become necessary in certain cases to take special measures in order to make the measuring head symmetrical to the object to be measured because it is impossible to support the object to be measured near enough the measuring zone and/or because the object to be measured has too littel rigidity or is deformed. The thinner a cable or a wire to be tested becomes the more even smallest asymmetries of the measuring head will affect the measurement in the sense of FIG. 3. In such cases, either means for automatically accomplishing symmetry must be provided or the measuring head must be formed in such a manner that asymmetries are without effect.

Figure 8:
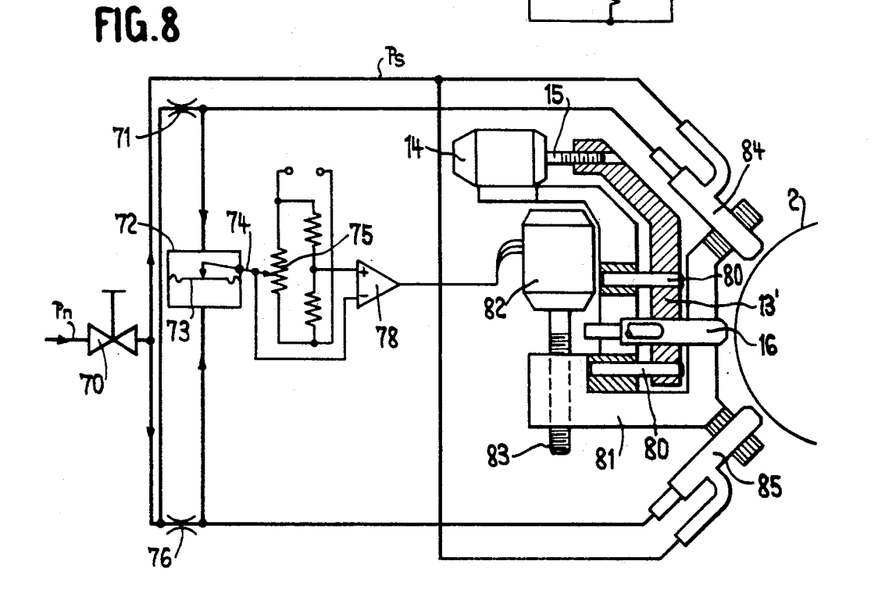
FIG. 8 is a pneumo-electric diagram showing an auxiliary servo-control system.

An automatic auxiliary servo-control system of this type for centering the measuring nozzle 16 relatively to the measuring object, for instance a cable 2, is shown in FIG. 8. Measuring nozzle 16 is schematically shown as being mounted in a carrier 13' which may be displaced in the axial direction of nozzle 16 by means of servo-motor 14 and spindle 15 as explained above with reference to FIG. 7. Carrier 13' is mounted for displacement in the direction of the axis of nozzle 16 on quiding pins 80 of an auxiliary carrier 81 which may be displaced in a direction perpendicular to the axis of nozzle 16 by means of an auxiliary servo-motor 82 and a spindle 83. The auxiliary carrier 81 carries two auxiliary measuring nozzles 84 and 85 similar to nozzle 16 and symmetrically disposed relatively to nozzle 16. Each of the exit slits of nozzles 84 and 85 is connected to a stabilized pressure $P_s$ of 0.2kp/cm² obtained from a pressure source producing a pressure $P_N$ by a pressure regulator 70. The sensing tubes of nozzles 84 and 85 are each fed through flow resistors 71 with a pressure of 0.05 kp/cm² . The sensing tubes of nozzles 84 and 85 are connected to opposite sides of the differential pressure meter 72 of the type shown in FIG. 7, and the diaphragm 73 of this meter operates the slider 74 of a potentiometer 75 connected into a measuring bridge of the type shown in FIG. 7 and described above. A servo-amplifier connected to the bridge output as shown in FIG. 7 energizes the auxiliary servo-motor 82.

As long as nozzles 84 and 85 are at the same distance from the surface of object 2, the same pressure is applied to both sides of diaphragm 73 of meter 72, the system is balanced and no signal is applied to servo-motor 82. The nozzle 16 is in precise radial and symmetrical position relatively to object 2, whereby correct measurement is effected. As soon as some deviation from this precisely radial position of nozzle 16 occurs due to displacement of the object 2 or due to distorsion of the same, nozzles 84 and 85 will no longer be at the same distance from the surface of object 2. A pressure difference is thus set up in meter 72 and the diaphragm 73 with slider 74 is displaced. The measuring bridge is unbalanced and servo-motor 82 is energized for shifting the auxiliary carrier 81 in a direction to restore the symmetry between the system of nozzles 16, 84, 85 and object 2.

Instead of two auxiliary measuring nozzles as shown in FIG. 8, two auxiliary measuring coils similar to the coil 18 may be provided, said auxiliary measuring coils then driving the measuring heads into symmetrical position with respect to the cable conductor. It would be conceivable to use both the auxiliary measuring nozzles at the same time for servo-controlled approaching the measuring heads to the object to be measured, whilst a servo-system reacts upon pressure differences between both the auxiliary measuring nozzles and a second servo-system reacts upon the pressure within the one auxiliary measuring nozzle or the average pressure within both the auxiliary measuring nozzles.

Figure 4:
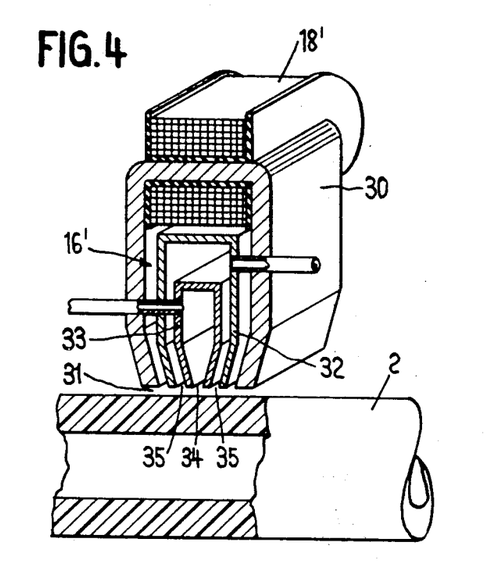
FIG. 4 shows schematically a side elevation of a variant of the measuring head.
Figure 5:
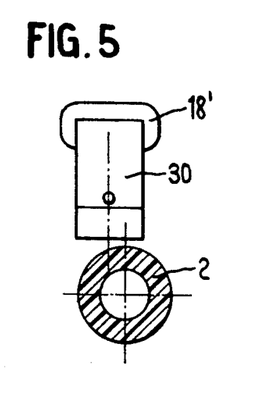
FIG. 5 shows the front view of the variant according to FIG. 4.

Another possibility of reducing the sensitivity of the measuring system to asymmetrical position of the measuring head with respect to the object to be measured is schematically indicated in FIGS. 4 and 5. The measuring coil 18 is replaced here by a measuring coil 18' including a high frequency core 30, wherein an elongated air 31 gap is formed, over which the object, e.g. the cable 2, to be measured moves. The field penetrating the object to be measured and especially its conductor in the range of the air gap produces a reaction on the coil inductance dependent on the distance of the core 30 and the air gap, respectively, from the conductor and consequently on the insulating thickness in the measuring place. The distance of the core 30 from the cable surface is defined by a measuring nozzle 16'. Supposing the field in the air gap is homogenously distributed over nearly the full length of the latter it makes no difference within a middle range of the air gap which point of the air gap is lying symmetrically over the object to be measured and its conductor respectively. Therefore, a certain asymmetry of the measuring system with respect to the object to be measured as indicated in FIG. 5 does not matter. Upon contactless measuring, however, not only the electromagnetic measuring pick-up but also the pneumatic measuring nozzle should be insensitive to asymmetries within certain limits. This may be realized by using a finely slotted nozzle, the longitudinal extension of which practically corresponds to that of the air gap. The measuring jet must be made of non-conducting material in every case in order to avoid a too strong influence to the field in the air gap.

This type of nozzle 16' is illustrated in detail in FIG. 4, wherein it is seen that the nozzle has an outer mantle 32 and an inner mantle 33. The inner mantle 33 forms a sensing slit 34 extending longitudinally in the air gap 31, this sensing aperture being connected to a differential pressure meter as shown at 72 in FIGS. 7 and 8. Exit slits 35 are formed between the inner and outer mantle of the nozzle, pressure air being fed to such exit slits during operation from a pressure air source as explained with reference to FIGS. 7 and 8. Exit slits 35 also extend longitudinally within the air gap 31, the length of sensing slit 34 and exit slits 35 corresponding substantially to the length of the core 30 and air gap 31 respectively.

The arrangement according to FIGS. 4 and 5 may be used preferably for measuring rather thin cables and wires or the like objects. This arrangement is also advantageous with non-contactless measurement, whereby a cable or wire to be tested is drawn over the air gap 31 while contacting core 30. An exact lateral guidance on the measuring head is unecessary because it makes no difference on which spot the object is lying in the homogenous field of the air gap. The width of the air gap is naturally adjusted to the required penetrating depth of the field. With the arrangement according to FIGS. 4 and 5 the otherwise usual unfavourable guide prisms for the cable 2 may be omitted, whereby the distance between the measuring system and the object to be measured may be reduced and the electro-magnetic coupling can be improved.

Further modifications are feasible. As an example, a coil 18 may be arranged also on the upper measuring head. Therewith a measurement would be possible simultaneously in two opposite places this allowing to reduce the measuring time and requires only a rotating of the support 9 through a range of 90°.

As already indicated, other objects to be measured, e.g. insulated pipes, coatings upon sheet material and the like can be tested by measuring devices adapted for the particular purpose.

What we claim is:

1. A method for measuring the thickness of an insulating layer on a metallic object, wherein a measuring head is approached to a predetermined distance from the layer and the thickness of the layer is measured by a measuring pick-up located in the measuring head and sensitive to the distance between it and said metallic object, the distance between the measuring head and a small area of the object to be measured being determined by directing a jet of air of small cross section from a measuring nozzle of small cross section against the surface of said layer and by mechanically controlling the position of said measuring head by motion transmission from non-pneumatic servo-motor means controlled by the pressure in said measuring nozzle, said distance between the measuring pick-up and said metallic object being measured in the vicinity of said nozzle and small area respectively.

2. A method according to claim 1, characterized in that the measurement of the thickness of the layer is carried out by means of the measuring pick-up in the range of influence of the jet of air.

3. A method according to claim 1, wherein as well said measuring nozzle as said measuring pick-up for measuring the thickness of the layer is approached to the layer perpendicularly to the layer.

4. A method according to claim 3, wherein the measurement is carried out in the immediate vicinity of a point of support of the object to be measured.

5. A method according to claim 4, for measuring the insulating thickness on electrical cables or the wall thickness of pipes, wherein the measurement is carried out in front of the extruder applying insulating material over the cable or extruding the pipe.

6. A method for measuring the thickness of an insulating layer on a metallic object at different places of said layer and object respectively without contact with said layer, comprising approaching a measuring head towards the layer in a first measuring place while directing a jet of air from a measuring nozzle towards the layer and maintaining the measuring head at a predetermined distance from said layer under servo-control by said air jet and measuring nozzle respectively, measuring without contact the distance between said measuring head and said metallic object and indirectly the thickness of the layer by means of a measuring pick-up, repeatedly operating said servo-control for removing said measuring head from said layer and moving it to another measuring place and again operating said servo-control for approaching said measuring head towards said layer and maintaining it at a predetermined distance from said layer in said other measuring place for measuring the distance of the measuring head from said metallic object and thickness of the layer respectively at said other measuring place.

7. A method according to claim 1, for measurement of the thickness of a curved layer on a metallic object, wherein said measuring head is radially approached towards said layer under control of an auxiliary servo-system including auxiliary measuring means disposed symmetrically with respect to said measuring nozzle.

8. A method for measuring the thickness of an insulating layer on a metallic object, wherein a measuring head is approached to a predetermined distance from the layer and the thickness of the layer is measured by a measuring pick-up located in the measuring head and sensitive to the distance between it and said metallic object, the distance between the measuring head and a small area of the object to be measured being determined by directing a jet of air of small cross section from a measuring nozzle of small cross section against the surface of said layer and by controlling the position of said measuring head by motion transmission from servo-mover means controlled by the pressure in said measuring nozzle, said distance between the measuring pick-up and said metallic object being measured in the vicinity of said nozzle and small area respectively.

9. A device for measuring the thickness of an insulating layer on a metallic object having at least one measuring head, servo-motor means including a guide spindle adapted to approach said measuring head towards said layer and to retract it from said layer, a measuring nozzle of small cross section fixed to said measuring head and adapted to blow a jet of air against the surface of said layer, said servo-motor means being controllable by said measuring nozzle, a measuring pick-up located in said measuring head near said nozzle and sensitive to the distance between it and said metallic object for measuring the thickness of the layer.

10. A device according to claim 9, wherein the coil for inductively measuring the thickness of the layer is provided, said measuring nozzle being concentrically arranged in said coil.

11. A device according to claim 9, comprising a servo-control system including means for periodically removing the measuring head from the range of influence of the object to be measured.

12. A device according to claim 9, characterized in that at least one measuring head is displaceable into a calibrating position.

13. A device according to claim 12, comprising a calibrating object and characterized in that at least one measuring head is swingably mounted for being swung to said calibrating object.

14. A device according to claim 13, wherein at least one of the measuring heads and the calibrating object are arranged on a common rotatable support surrounding a cable to be measured.

15. A device according to claim 9, wherein said measuring head has an inductive pick-up having an annular core, said core forming an elongated air gap destined to be approached to the object to be measured.

16. A device according to claim 15, wherein the measuring nozzle is located in the air gap.

17. A device according to claim 16, wherein an elongated slotted measuring jet is provided.

18. A device according to claim 9 for measuring the thickness of a substantially cylindrical shell of insulating material on a conductor inside said shell, comprising guide means allowing displacement of said measuring head in a direction substantially radial relatively to said cylindrical shell, said servo-motor means adapted for displacing said measuring head along said guide means, said measuring nozzle having elongated slit means forming an exit aperture extending in a direction substantially transversal to the axis of said cylindrical shell, said servo-motor means being controllable by said measuring nozzle, a measuring pick-up on said measuring head including an annular core having an elongated slit forming an air gap, said air gap extending in parallel to said exit aperture of said nozzle, a winding on said core for producing a magnetic field entering into said conductor within reach of said air gap, whereby the distance between said pick-up and said conductor and indirectly the thickness of said shell is measured by the reaction of said conductor onto said winding, measurement by said pick-up being substantially independent of the position of said shell within the length of said elongated air gap and exit aperture respectively.

19. A device according to claim 9, for producing and testing cylindrical objects having an extruded insulating shell and a metallic conductor being provided inside said shell, comprising an extruding nozzle, a testing apparatus, a structure carrying said extruding nozzle and testing apparatus, said apparatus including said measuring head displaceable along guide means in a radial direction relatively to said object emerging from said extruding nozzle, said measuring nozzle blowing an air jet in a radial direction relatively to said object onto the surface of said insulating shell of the object, in immediate vicinity of said extruding nozzle.

20. A device according to claim 9, wherein said measuring nozzle has an axis, auxiliary measuring nozzles being disposed symmetrically with respect to said axis of the measuring nozzle, said auxiliary measuring nozzles being adapted for producing a value significant for their distance from said insulating layer or metallic object respectively, means for measuring a difference between the values produced by said auxiliary measuring nozzles, and means for energizing an auxiliary servo-motor for adjusting said measuring nozzle in a direction perpendicular to its axis upon occurrance of a difference between said values for readjusting said measuring nozzle into a position symmetrical with respect to said insulating layer and metallic object respectively.

21. A device for measuring the thickness of an insulating layer on a metallic object having a first measuring head, servo-motor means including a guide spindle adapted to approach said measuring head towards said layer and to retract it from said layer, a measuring nozzle fixed to said measuring head and adapted to blow a jet of air against the surface of said layer, said servo-motor means being controllable by said measuring nozzle, a measuring pick-up located in said measuring head and sensitive to the distance between it and said metallic object for measuring the thickness of the layer and a second measuring head including at least a measuring nozzle and servo-motor means for control of said second measuring head and a measuring transducer connected to both measuring heads for producing a signal corresponding to their reciprocal distance and consequently a measure for the dimensions of the object to be measured located between the measuring heads.

22. A device for measuring the thickness of an insulating layer on a metallic object, comprising at least one measuring head, servo-motor means including guide spindle adapted to approach said measuring head towards said layer and to retract it from said layer, a measuring nozzle fixed to said measuring head and adapted to blow a jet of a pressure medium against the surface of said layer, said measuring nozzle having a sensing aperture inside a circular exit opening for a pressure medium, said sensing aperture communicating with the one inlet of a differential pressure meter of which the other inlet receives a reference pressure, a variable circuit element controllable by said differential pressure meter, said variable circuit element being connected into a measuring circuit for control of said servo-motor means, the servo-motor means being energized whenever a pressure difference is detected by said differential pressure meter, for adjusting the position of said measuring nozzle and measuring head respectively, and a measuring pick-up located in said measuring head and sensitive to the distance between it and said metallic object for measuring the thickness of the layer.

23. A method for measuring the thickness of an insulating layer on a metallic object, wherein a measuring head is approached to a predetermined distance from the layer and the thickness of the layer is measured by a measuring pick-up located in the measuring head and sensitive to the distance between it and said metallic object, the distance between the measuring head and the object to be measured being determined by directing a jet of air of small cross section from a measuring nozzle against the surface of said layer and by mechanically controlling the position of said measuring head by motion transmission from nonpneumatic servo-motor means controlled by the difference between the pressure in said measuring nozzle and a reference pressure nozzle.

24. A device for measuring the thickness of an insulating layer on a metallic object having at least one measuring head, servo-mover means adapted to approach said measuring head towards said layer and to retract it from said layer, a measuring nozzle of small cross section fixed to said measuring head and adapted to blow a jet of air against the surface of said layer, said servo-mover means being controllable by said measuring nozzle, a measuring pick-up located in said measuring head near said nozzle and sensitive to the distance between it and said metallic object for measuring the thickness of the layer.

* * * * *